Holmes & French.
Making Variegated Roving.
No. 258. Reissued Feb. 28, 1854.
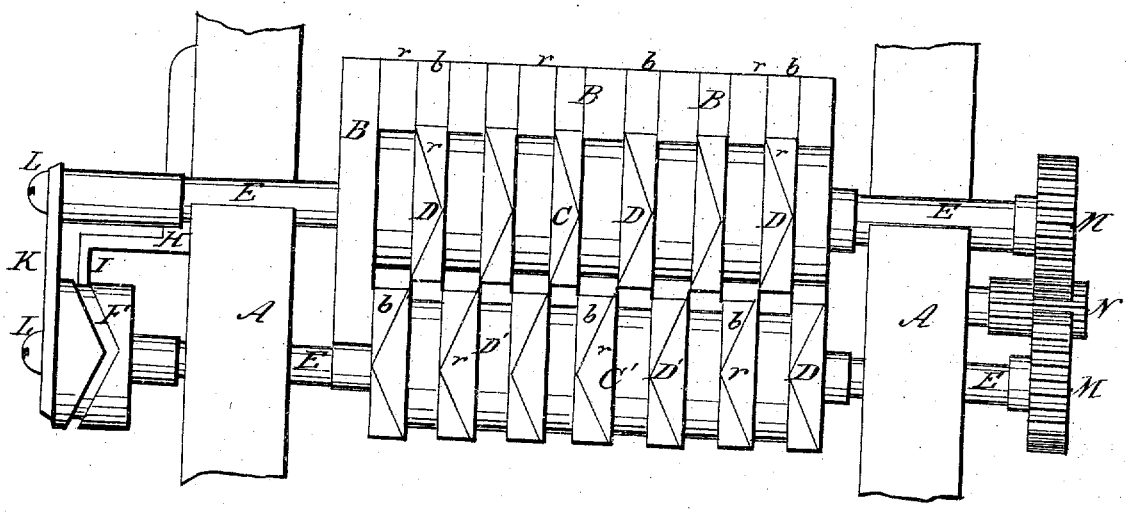
N. PETERS, PHOTO-LITHOGRAPHER, WASHINGTON, D. C.

UNITED STATES PATENT OFFICE.

JONAS HOLMES AND EPHRAIM FRENCH, OF LEE, MASSACHUSETTS.

IMPROVED PROCESS OF MANUFACTURING VARIEGATED ROVING.

Specification forming part of Letters Patent No. 8,948, dated May 18, 1852; Reissue No. 258, dated February 28, 1854.

*To all whom it may concern:*

Be it known that we, JONAS HOLMES and EPHRAIM FRENCH, both of Lee, in the county of Berkshire and State of Massachusetts, have invented a new and useful mode or process of manufacturing, by means of a carding-machine, variegated roving or slubbing; and we do hereby declare that our said invention is described and represented in the following specification and the accompanying drawing.

In carrying out our invention the doffers of the carding-machine are to have the card-teeth thereof arranged upon the cylindric surfaces in strips or rings extending around them, and with spaces between said rings, and the said doffers are not only to have their usual rotary motions, but they are to have traversing or endwise movements, as hereinafter described, and the fibrous material is to be fed or laid upon the main card-cylinder in strands, bands, layers, or masses of different colors, or in the shape of a sheet composed longitudinally of different colors or different colored material, the said strands of different colors being made to extend around the curved surface of said cylinder.

The several colors or materials carded or lying on the main card-cylinder are to be successively removed therefrom by each of the doffers during its traversing or endwise movements, whereby each of the slivers of roving taken from the doffers will be made variegated in appearance, it being composed of different-colored fibrous materials arranged alternately with respect to each other. This arrangement of the colors of the slivers may be produced by one doffer; but two may be employed to better advantage. When two are used, the rings of filleting or card of the one should be adjusted respectively opposite or over the spaces between those of the other, so that the material which is not removed from the main card-cylinder by the one may be caught up and taken from it by the other. The endwise or traversing movement of the doffer or doffers may be varied at pleasure, so as to produce corresponding changes in the variegated appearance of the roving. The strips of card-teeth of the doffer or doffers may be arranged in either zigzag or serpentine rows, or with such curves or angles or collections as may be desirable to produce, under the traversing movements of the doffer or doffers, any required variegated appearance of the roving. The slivers of roving so produced may be taken from or drawn off the doffers by condensing-rollers or such other apparatus as will serve to convert them into roving.

To enable persons skilled in the art to which our invention appertains or with which it is most nearly connected to practically understand and use it, we will now proceed to describe it more in detail, referring in such description to the accompanying drawing, which exhibits a front view of such parts of the carding-engine as may be deemed necessary for our purpose.

In such drawing, A A denote portions of the side of the frame-work of the carding-machine, while B exhibits the main card-cylinder covered with card-clothing in the usual manner. C C′ are two doffers, which play against the curved surface of said cylinder, and are respectively surrounded with rings or strips of card-filleting, placed so that each of the fillets or strips D D, &c., on the one doffer, C, shall come opposite to one space, D′ D′, between the adjacent fillets of the others. The fillets or rings upon the doffer C may be a little narrower than those upon the doffer C′. As C is the upper doffer, it is of course the first one that takes the fibrous material from the main cylinder, and the object of making its strips a little less in width than those of the other doffer, as described, is that said doffer C may not obtain more fibrous material from the cylinder than its proper share or portion. This, however, is not a necessary feature or part of our invention, but is only a change of construction in the filleting of one cylinder, which in some instances or at some times may be advantageous.

The journals E E of the doffer-shaft are to be so made that they may be able to turn and slide freely in their bearings or boxes, in order to enable the doffers to be traversed or moved with a reciprocating lateral movement by a cam, F, fastened upon the shaft of the doffer C′. This cam has a spiral or zigzag groove made in its periphery, into which extends a projection, I, from an arm or standard, H, fastened to the side A of the frame-work.

When the doffer C′ and the cam F are put in rotation, the doffer is caused to traverse or move laterally to and fro, the distance of every forward or backward movement being equal in width to one of the fillets of the doffer, the cam being so constructed that each traverse movement shall take place during a quarter-revolution of the said doffer. The bar K, which should be so connected to the shafts of both of the doffers by the screws L L as that the said screws may turn freely in said bar, causes the doffer C to move laterally in concert with the doffer C′, the rotary motions of the doffers being made to correspond by means of gears M M, fixed upon the doffer-shaft, and made to engage with a long pinion, N, put in rotation by any suitable mechanism. The arrangements of the spaces and fillets of one doffing-cylinder with respect to those of the other is exhibited by the drawing.

The carding-machine having been constructed as above described, the fibrous material, of different kinds or colors to be carded, is fed along or laid upon the main card-cylinder, so as to cover it with stripes of the different colors arranged alternately on it. For the sake of illustration, we will suppose that the colors of these stripes are red and black, as represented at *r r r*, &c., *b b b*, &c., in the drawings. As the doffers are put in rotation and move laterally, each alternately takes up the red and black fibrous material, for the fillets of teeth pass across the respective colors upon the main carding-cylinder, so that when the fillets of teeth upon the doffer C′ are catching or removing the black fibrous material the fillets upon the doffer C are catching or removing the red fibrous material, and vice versa. In such manner the roving taken from each strip of filleting of either of the doffers will be composed of red and black fibrous material interlaid alternately, there being a portion of the black, next a portion of the red, next a portion of the black, next a portion of the red, and so on.

We do not claim as our invention the making of doffing-cylinders with strips or rings of card-filleting extending around them and placed at intervals apart from each other, nor the using such in connection with a card-cylinder, nor the giving of such doffers, when so used, endwise motions during their rotary motions, as such have been heretofore employed in the manufacture of roving of one color; but What we do claim as our invention is—

Our mode of manufacturing the variegated roving, or that composed of separate masses of fibrous material of different colors laid together, as described, our said mode being a combination of processes which consists in feeding or disposing the fibrous material upon the main card-cylinder in strands, bands, layers, or masses of different colors, and so that they shall be disposed side by side of each other and around such cylinder, essentially as specified, and removing such fibrous material from the said main cylinder by a doffer or doffers, when constructed and made to operate therewith substantially as hereinbefore specified.

In testimony whereof we have hereunto set our signatures this 17th day of January, A. D. 1854.

JONAS HOLMES.
EPHRAIM FRENCH.

Witnesses:
JONATHAN F. COOK,
CHARLES H. SABIN.